United States Patent
De Bortoli

[11] Patent Number: 5,969,257
[45] Date of Patent: Oct. 19, 1999

[54] PRESSURE MEASURING MEMBRANE WITH RESONANT ELEMENT VIBRATING ORTHOGONAL TO MEMBRANE MOVEMENT

[75] Inventor: Eros De Bortoli, Cesiomaggiore, Italy

[73] Assignees: Consorzio Abb Per Lo Sviluppo Tecnologico, Milan, Italy; ABB Kent Taylor S.p.A., Lenno, Italy

[21] Appl. No.: 08/959,840

[22] Filed: Oct. 29, 1997

[30] Foreign Application Priority Data

Oct. 31, 1996 [IT] Italy .................................. MI96A2268

[51] Int. Cl.⁶ .................................................. G01L 11/00
[52] U.S. Cl. ............................................. 73/702; 310/338
[58] Field of Search ................... 73/702, 704, 717–722; 310/338

[56] References Cited

U.S. PATENT DOCUMENTS

| | | | |
|---|---|---|---|
| 5,062,302 | 11/1991 | Petersen et al. ...................... | 73/721 X |
| 5,178,015 | 1/1993 | Loeppert et al. ...................... | 73/708 |
| 5,275,055 | 1/1994 | Zook et al. . | |
| 5,367,217 | 11/1994 | Norling . | |
| 5,458,000 | 10/1995 | Burns et al. ........................ | 73/702 X |
| 5,528,939 | 6/1996 | Martin et al. .............................. | 73/702 |
| 5,553,506 | 9/1996 | Schirmer et al. . | |

FOREIGN PATENT DOCUMENTS

| | | |
|---|---|---|
| 0 456 029 | 11/1991 | European Pat. Off. . |
| 2 162 314 | 1/1986 | United Kingdom . |

OTHER PUBLICATIONS

Tokuji Saigusa et al: "Intelligent Differential Pressure Transmitter Using Micro–Resonators" Signal Processing and Systems Control, Intelligent Sensors and Instrumentation, San Diego, Nov. 9–13, 1992, vol. vol. 3, No. Conf. 18, Sep. 11, 1992, pag. 1634–39, XP000378729 Institute of Electrical and Electronics Engineers * the whole document *.

*Primary Examiner*—Joseph L. Felber
*Attorney, Agent, or Firm*—Guido Modiano; Albert Josif

[57] ABSTRACT

An improved device for measuring pressures, comprising a silicon membrane or diaphragm which is exposed, on its two faces, to two pressures whose difference is to be measured. A resonant element is provided on one face of the diaphragm, which is treated by selective chemical etching, and is mechanically coupled to the diaphragm so that its resonance frequency varies as a consequence of the deformation undergone by the diaphragm.

21 Claims, 4 Drawing Sheets

PRESSURE MEASURING MEMBRANE WITH RESONANT ELEMENT VIBRATING ORTHOGONAL TO MEMBRANE MOVEMENT

BACKGROUND OF THE INVENTION

The present invention relates to the measurement of pressures in the industrial field.

Pressure measurements are used extensively in process instruments and in control systems.

Conventional sensors use variations in the resonance frequency of a structure which is already oscillating due to the elastic deformations caused by external mechanical factors such as force, acceleration, pressure, etcetera, also of the differential-mode kind.

Conventional resonance sensors do not allow to achieve high performance in terms of resolution.

Moreover those sensors have a high cost and entail considerable construction difficulties owing to the complex system for the excitation of the resonant element and for signal acquisition.

Finally those sensors require an overpressure protection system which is external to the sensor and is generally very complex and difficult to provide.

SUMMARY OF THE INVENTION

The aim of the present invention is to provide a pressure measurement device which is an improvement with respect to the above-mentioned conventional devices.

This aim is achieved by means of the present invention, which consists of a device having the characteristics included in the appended claims.

According to the present invention, the resonant element or resonator is formed on the upper surface of a silicon diaphragm obtained by micromachining.

By appropriately machining a silicon structure, the invention allows to overcome the manufacturing difficulties of the prior art and to achieve mass-production of the pressure-sensitive diaphragm on a silicon wafer. The resonator excitation system and the signal processing circuits can also be integrated directly on the same silicon structure.

Furthermore, according to the present invention, it is possible to integrate on the silicon membrane another sensing element (based on the same principle or on a different one) capable of measuring the common-mode pressure applied to the membrane.

BRIEF DESCRIPTION OF THE DRAWINGS

The present invention is now described with reference to the accompanying drawings, which relate to preferred but non-limitative embodiments of the invention, and wherein.

DESCRIPTION OF THE PREFERRED EMBODIMENTS

Figure 1:
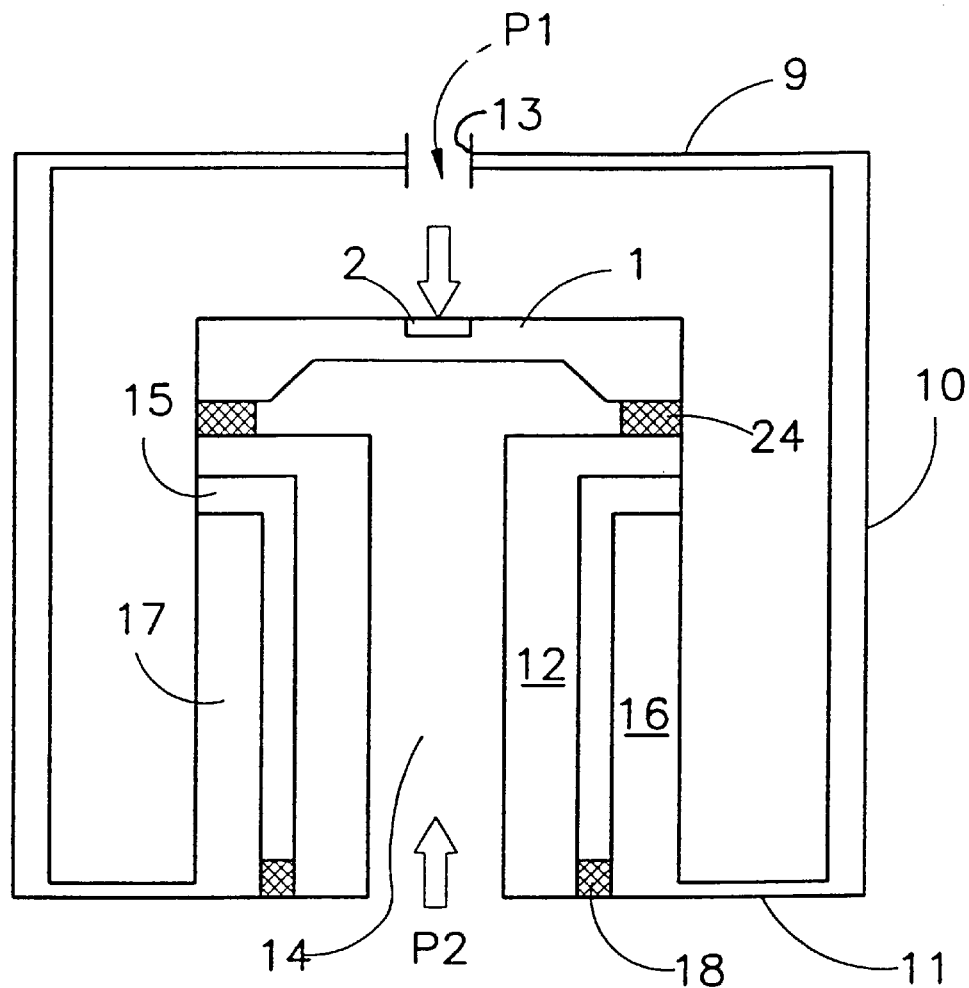
FIG. 1 is a schematic view of the structure of a pressure sensor according to the present invention.

In the figures, the same reference numerals are used to designate identical or substantially corresponding components.

With reference to FIG. 1, the sensor according to the present invention comprises a casing 10 which is preferably metallic and for example cylindrical and accommodates a membrane or diaphragm 1 which is suitable to be exposed to two pressures P1, P2 whose difference is to be measured. The casing 10 is provided with a base 11 and with a closure or cover 9 whereon it is possible to provide an optional opening 13 to allow one of the pressures (P1 in the figure) to access the diaphragm 1.

A support or post 12, preferably made of silicon, rises from the base 11 of the casing; the diaphragm 1, which accommodates a resonant element 2, is mounted on the support. Inside the post 12 there is provided a channel 14 for exposing the lower surface of the diaphragm 1 to the other one of the two pressures (P2 in the figure).

Figure 3:
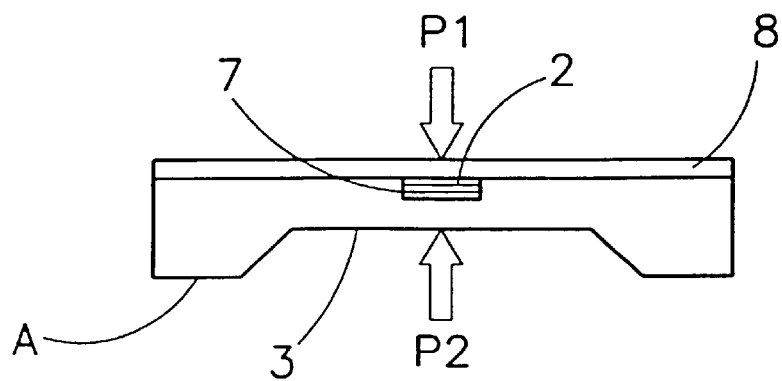
FIG. 3 is a more detailed view of the diaphragm and of the resonator of the device according to the present invention.

As shown in greater detail with reference to FIG. 3, the diaphragm 1 is constituted by a suitably machined silicon wafer and the resonant element 2 is formed at one of the two surfaces of the diaphragm. In order to provide insulation from common-mode pressure, it is possible to provide reinforcements, designated by the reference numerals 15, 16, 17 and 18, which are fixed both to the post 12 and to the external structure.

With reference to FIG. 3, in the absence of pressure stresses on the faces, i.e., when the pressures on both faces of the diaphragm 1 are identical, the resonant element 2 can be made to vibrate with a suitable excitation system and has a resonance frequency of its own. The resonant element can be formed, for example, by a simple bar which is fixed to the diaphragm with its ends.

When the two faces of the diaphragm 1 are exposed to different pressures P1 and P2, the diaphragm flexes upward or downward according to the difference between the pressures. In these conditions, by means of its couplings to the diaphragm, the resonator or resonant element 2 is subjected to elastic deformations (i.e., non-permanent deformations) causing compression or traction and its resonance frequency varies.

In order to avoid damping effects, the resonant element 2 is mounted at one of the faces of the diaphragm 1 in a cavity 7 formed on one of the two faces, and the cavity is kept in vacuum or in any case at a pressure of no more than $10^{-2}$ torr. The resonator 2 is housed within the diaphragm 1, keeping its ends rigidly coupled to the diaphragm, and the cavity 7 is closed hermetically (in vacuum or in any case at very low pressure) by a layer of silicon 8 which preferably covers the entire corresponding surface of the diaphragm.

Figure 2:
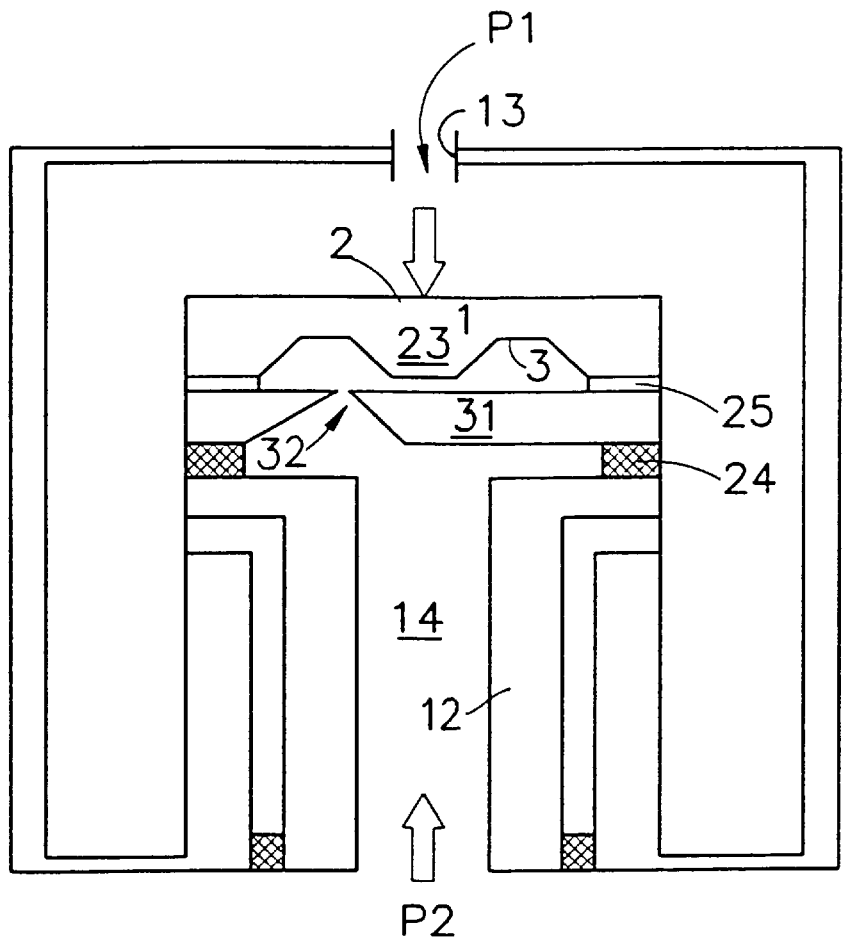
FIG. 2 is a view of a preferred embodiment of the pressure sensor according to the present invention.

The embodiment shown schematically in FIG. 2 further includes a protection against overpressures. The resonator 2 is more sensitive to compressions, and an excessive difference in pressure (overpressure) when P1>P2 might cause it to buckle.

According to the embodiment shown in FIG. 2, in order to limit the flexing of the diaphragm 1, such diaphragm is provided with a central protrusion or retainer 23 which protrudes from the lower surface 3 of the diaphragm 1 and is suitable to abut against a substrate 31 which is inserted between the post 12 and the diaphragm 1. In an upward region, the substrate 31 is joined to the edge of the diaphragm by means of a layer 25 of insulating material (preferably silicon oxide $SiO_2$), while in a downward region the substrate 31 is applied to the post by means of an annular layer 24 of insulating material (preferably Pyrex (registered trademark), a glass product).

Preferably, the protrusion 23 is formed monolithically with the diaphragm 1. The dimensions of the raised portion are chosen so as to avoid appreciably altering the elastic deformation characteristics of the diaphragm.

The substrate 31 is relatively rigid and has a hole 32 for keeping the lower face of the diaphragm connected to the channel 14. The abutment surface of the protrusion 23 is arranged peripherally on a plane which is parallel to the plane of the membrane and to the plane of the substrate 31.

Figure 4:
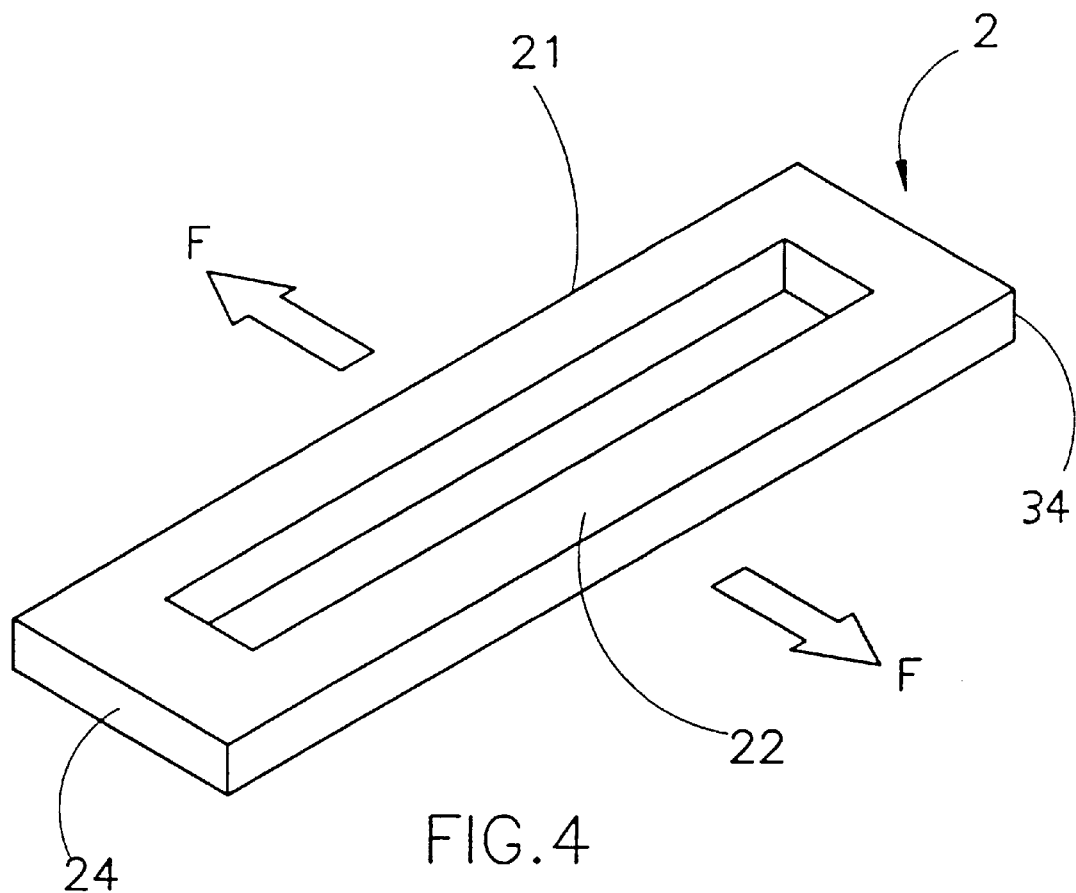
FIG. 4 is a perspective view of a resonator of the DETF type.

FIG. 4 illustrates the structure of a resonator 2 according to the present invention, which is formed by a balanced resonator which is capable of minimizing the constraint reactions caused by the oscillations of the resonator, thus reducing the effect of the damping actions at the coupling points between the resonator and the diaphragm. The resonator 2 is formed by two parallel prongs or arms 21, 22 which are joined at their ends and is known as DETF (Double Ended Tuning Fork); its lateral vibrations, i.e., the vibrations which are perpendicular to the movement of the diaphragm and are designated by the arrows F in FIG. 4, are used.

In the balanced resonator, the prongs 21, 22 vibrate in phase opposition and at the constrained ends 34 the reactions to the motion of the two prongs partially compensate each other, with a consequent lower dissipation of energy with respect to the case of a single vibrating prong. The balanced structure also allows several additional advantages, such as greater stability with respect to external influences, higher resolution, and reduction of the effect of long-term drifts.

Figure 5:
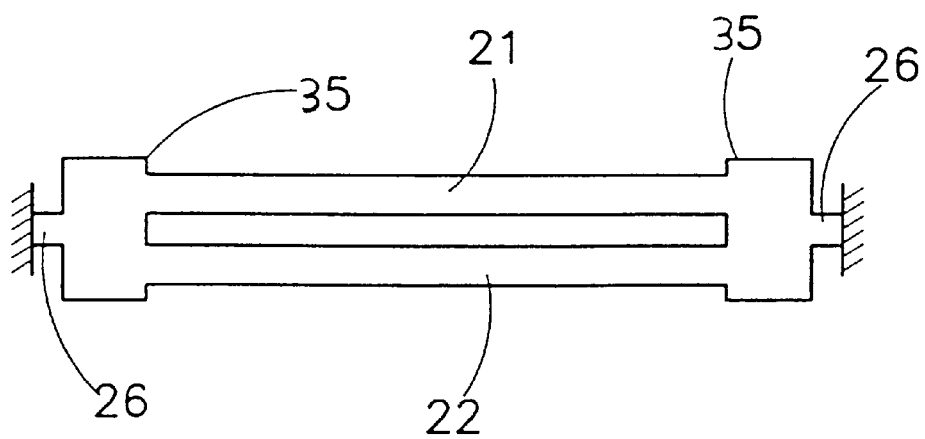
FIG. 5 is a view of a preferred embodiment of the DETF resonator.

Advantageously, as shown in the preferred embodiment in FIG. 5, the DETF resonator is configured so as to have, at each end, two lateral protrusions 35 and a connecting portion 26 which are respectively wider and narrower than the central portion of the resonator.

It is of course possible to use resonators with three or more parallel prongs.

Figure 6:
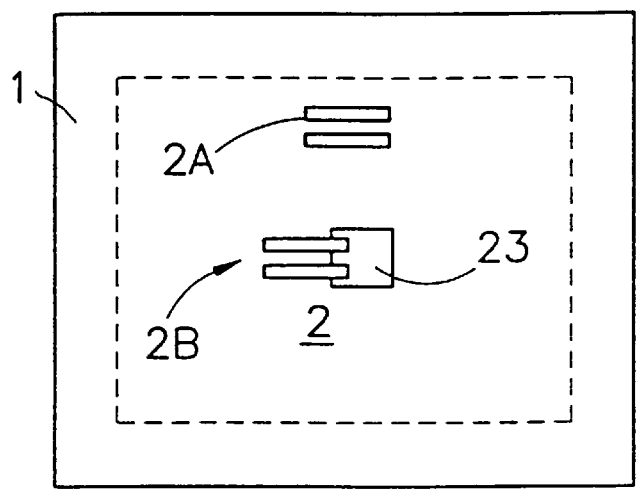
FIG. 6 is a plan view of some possible arrangements of the resonator and/or of the element that is sensitive to common-mode pressure on the diaphragm.

Preferably, as shown in FIG. 6, the resonator 2 can be formed in various positions inside the diaphragm in order to achieve optimum sensitivity. More specifically, according to a first embodiment designated by the reference numeral 2B, it can be arranged substantially at the center of the diaphragm 1 and parallel to the plane of the diaphragm, in order to achieve maximum sensitivity. According to another embodiment, designated by the reference numeral 2A in FIG. 6, the resonator can be formed (or in any case positioned) at the edge of the diaphragm 1. This embodiment has lower sensitivity but offers the advantage of limiting the effects of overpressures.

Moreover, according to the present invention, an additional sensing element, which need not be provided in the same manner and according to the same principle as described above, can be integrated on the silicon membrane and allowed to measure the common-mode pressure applied to the membrane.

According to a preferred embodiment, the resonator can be employed to measure the common-mode pressure by using a suitable electronic circuitry to detect the change of resistance of the resonator, said change being a consequence of the mechanical stress acting on the resonator itself and generated by the common-mode pressure.

The device also has an excitation system for generating the oscillations of the resonator and a system for acquiring them.

Figure 7:
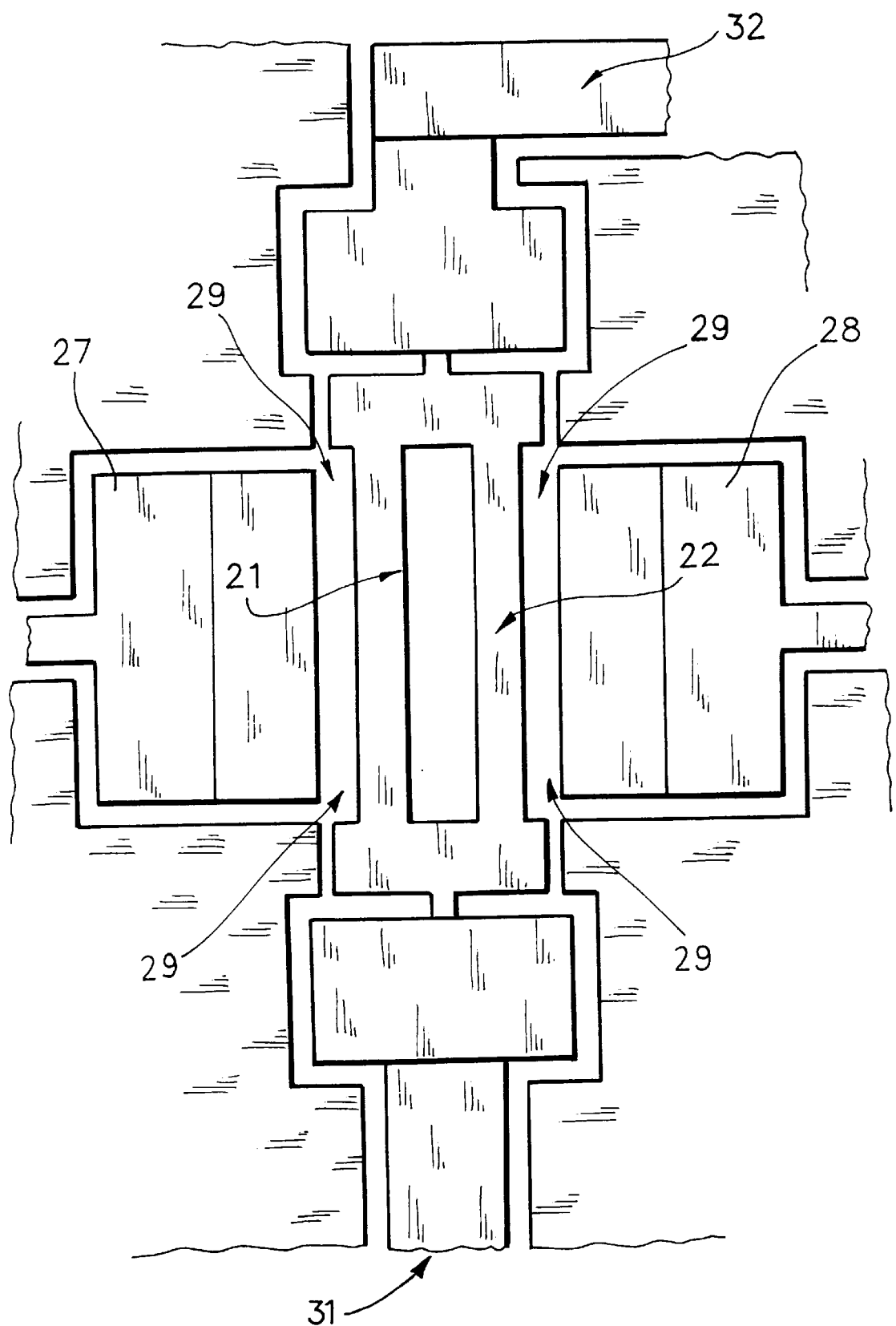
FIG. 7 is a schematic plan view of the excitation and acquisition systems.

In the embodiment shown schematically in FIG. 7, the excitation system is of the electrostatic or piezoelectric type and has two armatures or electrodes 27 and 28 which are parallel to the arms 21 and 22 of the resonator 2 and are insulated from the resonator by means of insulating layers 29. The acquisition system is of the piezoresistive type and the voltage signal is detected by terminals 31 and 32. The acquisition can be carried out, for example, through a bridge circuit.

The present invention has been described with reference to particular and preferred embodiments; however, it is not limited to what has been described but instead also covers the variations and modifications that will be evident to those skilled in the art.

What is claimed is:

1. A device for measuring a pressure, comprising a diaphragm which is installed inside a casing and is exposed, on its two faces, to two pressures whose difference is to be measured, wherein said diaphragm is formed by a silicon membrane, and a resonant element is housed within said diaphragm, said device further comprising excitation means for generating the oscillations of the resonant element and means for acquiring them, said excitation means being arranged laterally and in the same plane with respect to said resonant element, said resonant element generating, when excited by said excitation means, vibrations which are orthogonal with respect to a movement of said diaphragm.

2. The device according to claim 1, wherein said resonant element is formed by at least one single elongated element.

3. The device according to claim 1, wherein said resonant element is formed by two parallel elongated elements or prongs which are joined at their ends.

4. The device according to claim 3, wherein said two prongs have, at each end thereof, two lateral protrusions and a connecting portion which are respectively wider and narrower than a central portion of the resonant element.

5. The device according to claim 1, wherein said diaphragm is formed monolithically from a silicon wafer by machining.

6. The device according to claim 5, wherein said resonant element is obtained monolithically from said silicon wafer from which the diaphragm is obtained.

7. The device according to claim 1, wherein said resonant element is accommodated in a cavity or is connected mechanically to the diaphragm with its ends.

8. The device according to claim 7, wherein the pressure inside said cavity is lower than $10^{-2}$ torr.

9. The device according to claim 1, wherein said diaphragm is fitted on a support or post which rises from a base of the casing, and wherein a channel is formed inside said post in order to expose one face of the diaphragm to one of said two pressures.

10. The device according to claim 9, wherein said post has reinforcements which are fixed to said post and to the casing, so as to provide insulation with respect to pressure.

11. A device according to claim 9, further comprising a substrate which is inserted between said post and the diaphragm, and wherein said diaphragm has a central protrusion which is relatively rigid, protrudes from the surface of the diaphragm, and is suitable to abut against said substrate in order to limit the flexing of the diaphragm.

12. The device according to claim 11, wherein said substrate has a hole for keeping the lower face of the diaphragm connected to said channel.

13. The device according to claim 12, wherein said substrate is joined, in an upward region, to the edge of the diaphragm by means of a layer of insulating material, and wherein in a downward region said substrate is applied to the post by means of an additional layer of insulating material.

14. The device according to claim 12, wherein said protrusion is formed monolithically with the diaphragm and an abutment surface of the protrusion lies on a plane which is parallel to the surface of the diaphragm and to the surface of said substrate.

15. The device according to claim 1, wherein said resonant element is located substantially at the center of the diaphragm.

16. The device according to claim 1, wherein said resonant element is located at the edge of the diaphragm.

17. The device according to claim 1, wherein said excitation means of the resonant element comprise an electrostatic system formed by fixed armatures or electrodes and moving armatures or electrodes formed by prongs of the resonant element.

18. The device according to claim 1, wherein said excitation means of the resonant element comprise a piezoelectric system formed by fixed armatures or electrodes and moving armatures or electrodes formed by prongs of the resonant element.

19. The device according to claim 1, wherein said excitation means also acquire the oscillations.

20. The device according to claim 1, wherein said pressure to be measured is an absolute pressure.

21. The device according to claim 1, wherein said pressure to be measured is a differential pressure.

* * * * *